(12) United States Patent
Tian et al.

(10) Patent No.: US 9,098,767 B2
(45) Date of Patent: Aug. 4, 2015

(54) SYSTEM AND METHOD FOR DETERMINING THE INFORMATIVE ZONE OF AN IMAGE

(75) Inventors: Aibo Tian, Austin, TX (US); Xuemei Zhang, Mountain View, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1060 days.

(21) Appl. No.: 13/094,531

(22) Filed: Apr. 26, 2011

(65) Prior Publication Data

US 2012/0257830 A1 Oct. 11, 2012

Related U.S. Application Data

(60) Provisional application No. 61/474,260, filed on Apr. 11, 2011, provisional application No. 61/474,266, filed on Apr. 11, 2011.

(51) Int. Cl.
*G06K 9/00* (2006.01)
*G06K 9/32* (2006.01)

(52) U.S. Cl.
CPC .................... *G06K 9/3233* (2013.01)

(58) Field of Classification Search
USPC .......... 382/159, 190, 199, 206, 224, 291, 294
See application file for complete search history.

(56) References Cited

U.S. PATENT DOCUMENTS

| | | | |
|---|---|---|---|
| 6,654,506 B1 * | 11/2003 | Luo et al. | 382/282 |
| 6,980,699 B1 | 12/2005 | Okada | |
| 7,352,917 B2 | 4/2008 | Kondo et al. | |
| 7,495,709 B2 | 2/2009 | Abe | |
| 7,689,909 B1 | 3/2010 | Szuszczewicz | |
| 7,756,334 B2 | 7/2010 | Kim et al. | |
| 7,835,571 B2 | 11/2010 | Kaku | |
| 7,852,410 B2 | 12/2010 | Ishii et al. | |
| 8,009,921 B2 * | 8/2011 | Csurka | 382/228 |
| 8,693,780 B2 * | 4/2014 | Tal et al. | 382/190 |
| 2002/0114535 A1 * | 8/2002 | Luo | 382/282 |
| 2008/0222560 A1 | 9/2008 | Harrison | |
| 2009/0167870 A1 | 7/2009 | Caleca et al. | |
| 2009/0208118 A1 * | 8/2009 | Csurka | 382/228 |
| 2009/0316989 A1 | 12/2009 | Barbieri et al. | |
| 2010/0329550 A1 | 12/2010 | Cheatle | |
| 2012/0113307 A1 * | 5/2012 | Watanabe et al. | 348/333.01 |
| 2012/0257830 A1 | 10/2012 | Tian et al. | |
| 2012/0257842 A1 | 10/2012 | Tian et al. | |

FOREIGN PATENT DOCUMENTS

WO WO-2011053287 5/2011

OTHER PUBLICATIONS

Sandhaus et al.; Employing Aesthetic Principles for Automatic Photo Book Layout.

(Continued)

*Primary Examiner* — Wesley Tucker
(74) *Attorney, Agent, or Firm* — Hewlett-Packard Patent Department

(57) ABSTRACT

A system and a method are disclosed that determine the informative zone of an image. A system and method include receiving image data representative of an image, determining the non-redundant regions of the image based on analysis of patterns of the image data, and determining an area of the image that encompasses the non-redundant regions of the image as the informative zone of the image.

19 Claims, 10 Drawing Sheets

(56) References Cited

OTHER PUBLICATIONS

L. Itti, L. et al, "A model of saliency-based visual attention for rapid scene analysis," IEEE Trans. On PAMI, 20(11):1254-1259.

T. Liu et al, "Learning to Detect a Salient Object," Conference on Computer Vision and Pattern Recognition (CVPR) 2007: 1-8.

C. B. Atkins. Blocked recursive image composition. ACM Multimedia 2008: 821-824.

H. Chao et al., "Blocked recursive image composition with exclusion zones," Proceedings of the 10th ACM Symposium on Document Engineering, pp. 111-114, Sep. 21-24, 2010.

Gao et al., "MagicPhotobook: designer inspired, user perfected photo albums," Oct. 2009, Proceedings of the 17th ACM International conference on Multimedia, pp. 979-980, ACM.

L, Itti: L. et al, "A model of saliency-based visual attention for rapid scene analysis," IEEE Trans. On PAMI, 20(11):1254-1259. Nov. 1998.

Rother et al., "Autocollage," Jul. 2006. ACM Transactions on Graphics (TOG), vol. 25, No. 3, pp. 847-852, ACM.

Sandhaus et al., "Employing Aesthetic Principles for Automatic Photo Book Layout," Advances in Multimedia Modeling, 17th International Multimedia Modeling Conference, MMM 2011, Taipei Taiwan, Jan. 5-7, 2011, Proceedings, Part 1, pp. 84-95. Springer Berlin Heidelberg, 2011.

Tian et al., "Content-aware photo-on-photo composition for consumer photos," Proceedings of the 19th ACM International conference on Multimedia, Nov. 28-Dec. 1, 2011, pp. 1549-1552, ACM. <http://www.cs.utexas.edu/users/atian/resource/paper/tian_mm11.pdf>.

Xiao et al., "Mixed-initiative photo collage authoring," Oct. 2008, Proceedings of the 16th ACM International conference on Multimedia, pp. 509-518, ACM.

Zhang et al., "Aspatial extension of CIELAB for digital colorimage reproduction," 97, Journal of the Society for Information Display; vol. 5, No. 1, pp. 61-63.

\* cited by examiner

SYSTEM AND METHOD FOR DETERMINING THE INFORMATIVE ZONE OF AN IMAGE

CROSS-REFERENCE TO RELATED APPLICATIONS

This patent application claims priority to U.S. application No. 61/474,260, titled "System and Method for Determining Image Placement on a Canvas," filed Apr. 11, 2011, and U.S. application No. 61/474,266, titled "System and Method for Determining the Informative Zone of an Image," filed Apr. 11, 2011, each of which are incorporated by reference for the disclosed subject matter as though fully set forth herein. This patent application is related to U.S. patent application Ser. No. 13/094,097, filed Apr. 26, 2011, now U.S. Pat. No. 8,682,108, which is incorporated by reference for the disclosed subject matter as though fully set forth herein.

BACKGROUND

With the rapid increase of the digital consumer image collections, there is a growing trend in personal creation and publication of photo-based products such as photobooks. Many photo composition applications have difficult and slow creation processes, or strong constraints in the final appearance of the composition that are determined by the background artwork or constraints of the composition algorithm. A tool that facilitates identification of the main content of an image would be beneficial for faster composition applications.

DETAILED DESCRIPTION

Figure 1A:
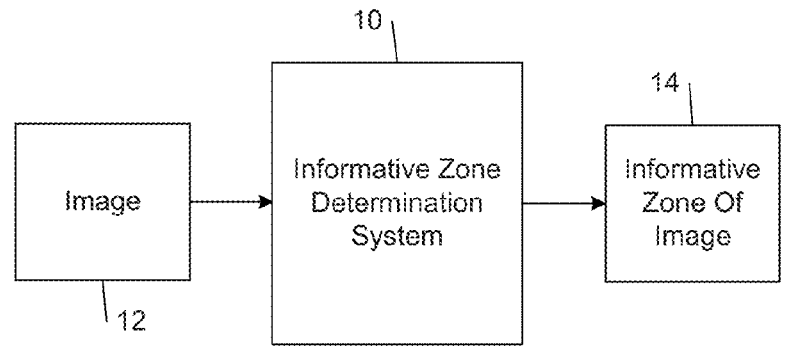
FIG. 1A is a block diagram of an example of a informative zone determination system for the informative zone of an image.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of machine-readable instructions that a computer can interpret and execute to perform one or more specific tasks. A "data file" is a block of information that durably stores data for use by a software application.

The term "computer-readable medium" refers to any medium capable storing information that is readable by a machine (e.g., a computer system). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Described herein are novel systems and methods for determination of the informative zone of an image. The systems and methods facilitate determining an image content redundancy measure. In an example, using the informative zone information determine according to the principles herein, an image can be autocropped. In another example, a system and a method described herein facilitate automatic selection of a background image from a collection of images based on the informative zones of the images. A composite image can be generated using an engine for overlaying foreground images outside the informative zone of the background image in the composition. The composite image can be a page of a photobook, a designated layout region of a brochure, magazine or other printable product, photo albums, regions of clothing or other pieces of fabrics or surfaces, and a screen.

In an example, the systems and methods described herein facilitate composition of photobooks, photo pages, and other similar products, using only the consumers' image collection. In some examples, the theme constraints that can be imposed by typical background art designs used in some photo products may be used with the systems and methods described herein, but are not imposed by the systems and methods herein.

In an example system and method herein for identifying the informative zone, for determining the foreground image areas, or for generating a composite image, the aesthetics of composition is taken into account. For example, regions of a background image that can be covered by foreground images may not be blank or low contrast regions of the background image. In an example, regions of the background image that can be covered by foreground images may be regions with repeated or extended image features. For example, in a composition with a background image having scenes dominated by horizontal patterns (such as mountain ranges), the foreground images can be placed in a vertical arrangement, covering regions of the background image with repeated content. In the aesthetics of composition, regions with repeated or extended image features can be mentally recovered by an observer through visual inference, and as a result may be covered. Also, blank regions of a background image play a role in visual design, as an observer may not feel comfortable looking at a design with no blank region. In an example, foreground images may be placed around the periphery of the background image rather than the center. In another example, the foreground images may be arranged in straight-line or block formations. An irregular arrangement may be created by adding small disturbance to a composition based on a straight-line or block arrangement.

FIG. 1A shows an example of a informative zone determination system 10 that determines the informative zone 14 of an image 12. The informative zone determination system 10 receives image data representative of image 12, and, according to example methods described herein, determines the informative zone 14 of image 12. The input to the informative zone determination system 10 also can be a collection of images for each of which the informative zone is determined.

An example source of images is personal photos of a consumer taken of family members and/or friends. Another example source is images captured by an image sensor of, e.g., entertainment or sports celebrities, or reality television individuals. The images can be taken of one or more members of a family near an attraction at an amusement park. In an example use scenario, a system and method disclosed herein is applied to images in a database of images, such as but not limited to images captured using imaging devices (such as but not limited to surveillance devices, or film footage) of an area located at an airport, a stadium, a restaurant, a mall, outside an office building or residence, etc. It will be appreciated that other sources are possible.

Figure 1B:
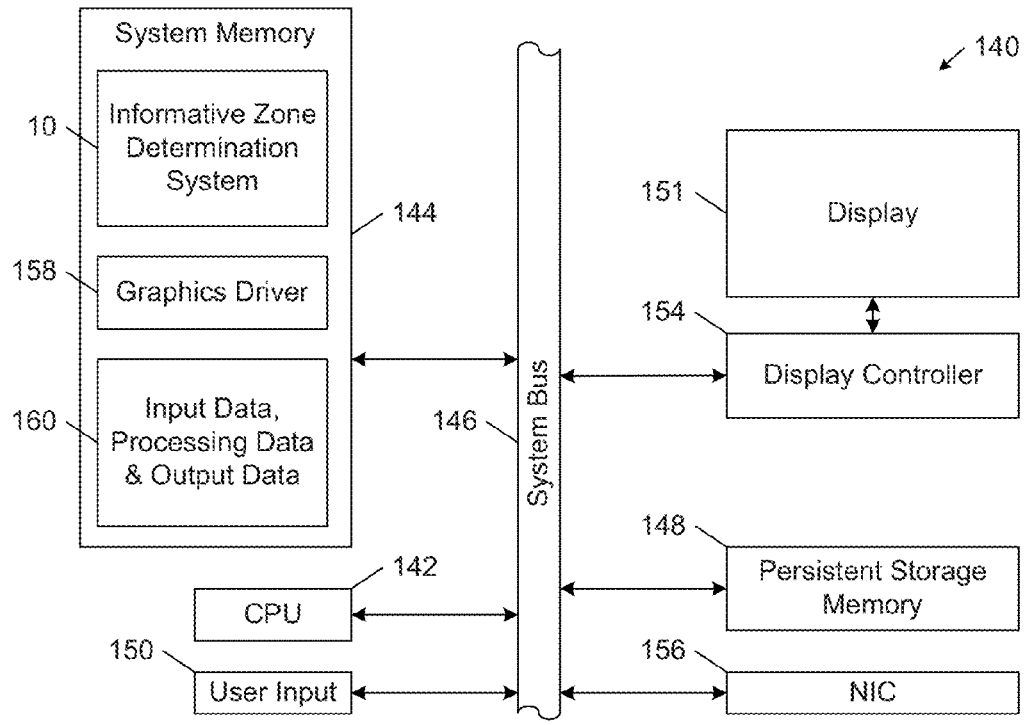
FIG. 1B is a block diagram of an example of a computer system that incorporates an example of the informative zone determination system of FIG. 1A.

FIG. 1B shows an example of a computer system 140 that can implement any of the examples of the informative zone determination system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 1B, the system memory 144 also stores the informative zone determination system 10, a graphics driver 158, and processing information 160 that includes input data, processing data, and output data. In some examples, the informative zone determination system 10 interfaces with the graphics driver 158 to present a user interface on the display 151 for managing and controlling the operation of the informative zone determination system 10.

The informative zone determination system 10 can include discrete data processing components, each of which may be in the form of any one of various commercially available data processing chips. In some implementations, the informative zone determination system 10 is embedded in the hardware of any one of a wide variety of digital and analog computer devices, including desktop, workstation, and server computers. In some examples, the informative zone determination system 10 executes process instructions (e.g., machine-readable instructions, such as but not limited to computer software and firmware) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

The principles set forth in the herein extend equally to any alternative configuration in which informative zone determination system 10 has access to images 12. As such, alternative examples within the scope of the principles of the present specification include examples in which the informative zone determination system 10 is implemented by the same computer system, examples in which the functionality of the informative zone determination system 10 is implemented by a multiple interconnected computers (e.g., a server in a data center and a user's client machine), examples in which the informative zone determination system 10 communicates with portions of computer system 140 directly through a bus without intermediary network devices, and examples in which the informative zone determination system 10 has a stored local copies of images 12.

Figure 2A:
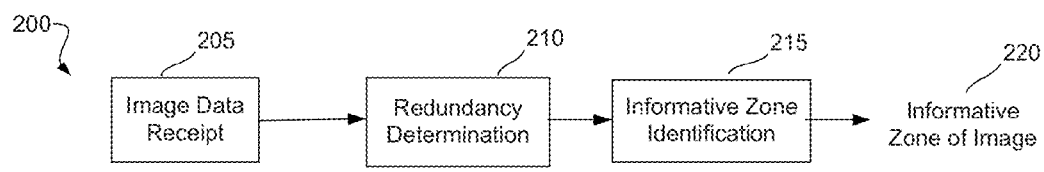
FIG. 2A is a block diagram of an example functionality implemented by an illustrative computerized informative zone determination system.

Referring now to FIG. 2A, a block diagram is shown of an illustrative functionality 200 implemented by informative zone determination system 10 for determining the informative zone of an image, consistent with the principles described herein. Each module in the diagram represents an element of functionality performed by the processing unit 142. Arrows between the modules represent the communication and interoperability among the modules. In brief, image data representative of an image is received in block 205, the non-redundant regions of the image is determined in block 210 based on analysis of the patterns of the image data, and an area of the image that encompasses the non-redundant regions of the image is determined as the informative zone of the image by block 215.

Referring to block 205, image data representative of an image is received. Image data representative of the image include data representative of image forming elements of the image and image values. The image forming elements refer to an addressable region of the image. In some examples, the image forming elements correspond to pixels, which are the smallest addressable units of an image. Each image forming element has at least one respective image value that can be represented by one or more bits. For example, an image forming element in the RGB color space can include a respective image value for each of the colors (such as but not limited to red, green, and blue), and each of the image values may be represented by one or more bits. Examples of the data indicative of the informative zone of an image include pixel value and pixel coordinate relative to the image.

Referring to block 210, the non-redundant regions of the image is received based on analysis of patterns of the image data. The non-redundant regions of the image are determined by a redundancy determination module. Redundancy is a measure of the predictability of spatial, statistical, or motion parameters derived from an images or sequences of images. In an example, a constant-value portion of an image, a portion where every pixel has about the same pixel value, can be determined as a redundant region. That is, the entire portion of the image can be represented by single number. In another example, a random-valued portion of an image, that is a portion where the patterns are completely unpredictable, can be assigned zero or low redundancy and determined as a non-redundant region. In an example, redundancy can be determined based on repetition of pixel values that can take the form of constant-valued regions. In another example, redundancy can be determined based on spatial patterns of pixel values that can be represented by a smaller number of bits. In another example, redundancy can be determined based on parameters derived from a transformed image. Non-limiting examples of the transformation include where the image is represented by an array of Fourier or Cosine transformation coefficients (where the coefficients are the parameters). Other non-limiting examples of the transformation include statistical representations of pixel values of the image, such as mean and standard deviation. In another example, the transform is a perceptual pre-filtering of the image. For example, perceptual spatio-color filtering can be performed, and used to remove content in the image not visible to the human eye. In another example, redundancy can be determined based on nonspatial properties of an image, including spectral frequency that can be used to describe periodic redundancy within image data. The non-redundant regions of the image, according to the principles herein, have an overall redundancy that is lower than the redundancy of other regions of the image.

In block 215, based on the redundancy of regions of the image as determined in block 210, the informative zone of the image 220 can be identified.

Figure 2B:
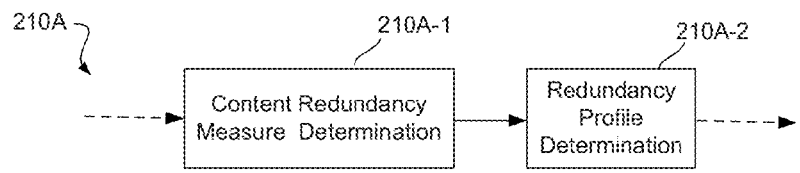
FIG. 2B is a block diagram of an example functionality implemented by an illustrative redundancy determination system.

FIG. 2B shows an example operation 210A of a redundancy determination module. In block 210A-1, a content redundancy measure of the image is determined, and in block 210A-2 a redundancy profile is determined. A result of implementation of block 210A is an indication of the redundancy of locations within the image.

Figure 3:
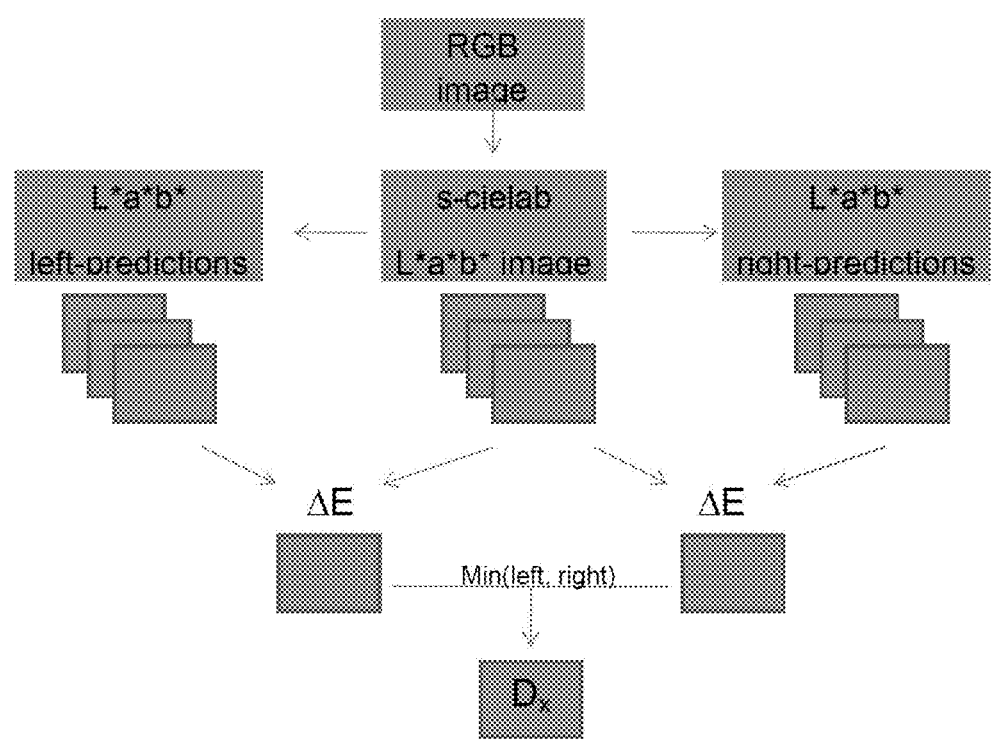
FIG. 3 illustrates example determination of a redundancy map.
Figure 4A:
FIG. 4A shows and example image.
Figure 4B:
FIG. 4B shows example output of a horizontal redundancy map of FIG. 4A.
Figure 4C:
FIG. 4C show example output of a vertical redundancy map of FIG. 4A.

Referring to block 210A-1, an example content redundancy measure determination is as follows. Redundancy on the horizontal (X) and vertical (Y) dimensions of the image can be computed separately and independently. In an example, an error in linear prediction is used to measure content redundancy. If V is used to represent pixel values of a 3-color image, and for a pixel value $v_n$ at location $x_n$ in the horizontal direction, a one-sided redundancy measure can be represented as a deviation from a linear prediction from the values $v_0$ to $v_{n-1}$ according to the expression:

$$D_n = \Delta E\{t_n'(T_{n-1}'t_{n-1})^{-1}(T_{n-1}'V_{n-1}), v_n\} \qquad (1)$$

where $t_n$ is a vector of 2 elements $(1, x_n)'$, and $T_n = (t_1 \ldots t_n)'$, where $T_n$ is a standard predictor term used in linear regression, $x_n$ is pixel coordinate at location n, $v_n$ is a vector of L*a*b* values after s-cielab transformation at location n, $V_n = (v_1 \ldots v_n)'$, and $\Delta E$ is cie L*a*b* color difference. FIG. 3 Illustrates computation of a horizontal redundancy map for pixel locations according to Eq (1) in the X direction. The terms left-prediction and right-prediction refer to the direction of the computation across the horizontal dimension of the image. Computation of the vertical redundancy image $D_y$ in the vertical dimension (Y) is similar to that for $D_x$, except that left-prediction and right-prediction are replaced by top-prediction and bottom-prediction. In this example, higher values in $D_x$ and $D_y$ images indicate high information content (low redundancy). The S-CIELAB is a perceptual pre-filtering step in color opponent channels to model the different spatial sensitivity to luminance and chromatic features in an image. This pre-filtering can improve redundancy estimates in color textured areas. FIG. 4B shows an example output of $D_x$ image, and FIG. 4C shows an example output of $D_y$ image (horizontal and vertical redundancy maps) that are derived based on the image of FIG. 4A. In an example, lower values in the redundancy map indicate redundant areas of the image.

The content redundancy measure is used to identify the boundaries of the non-redundant regions of the image. This region is determined as the informative zone of the image. The boundaries of the informative zone can be identified by a shape, such as but not limited to be a square, rectangle, circle, or other polygon. In an example, the smallest shape that bounds the non-redundant regions is determined as the informative zone. In an example, each of the boundaries of the informative zone are determined separately and independently. For one boundary, a two dimensional computation can be reduced to a one dimensional computation.

Referring to block 210A-2, an example redundancy profile determination is as follows. The $D_x$ and $D_y$ images are collapsed into one dimensional profiles $P_x$ and $P_y$ that indicate the general informative level at each location along the horizontal and vertical dimensions. Using $M_x$ and $M_y$ to denote the averaging operation along the x and y dimensions, respectively, the profiles can be expressed as follows:

$$P_x = [M_y\{D_x^{\alpha x}\}]^{1/\alpha x} \qquad (2)$$

$$P_y = [M_x\{D_y^{\alpha y}\}]^{1/\alpha y} \quad (3)$$

where $\alpha_x$ and $\alpha_y$ are exponents used to emphasize larger D values in the final average. In this example, the highly informative regions are not left out of the informative zone even if they occupy a relatively small region in the image. In an example implementation, the value of $\alpha_x$ is set around 4 and the value of $\alpha_y$ is set around 8. Different exponents are used for the x and y dimensions to account for the different distribution of features along the two dimensions in natural images. For example, feature repetitions tend to occur on the horizontal dimension, and appear in the vertical dimension less frequently (due to physical effects of gravity). Use of a larger exponent for $P_y$ ensures that there is no cut too aggressive in the vertical direction. The informative zone identification in block 215 is performed using the result of the implementation in block 210A-2. From the x- and y-profiles of informative level on each location, boundaries around the non-redundant region can be advanced in each direction (left/right/top/bottom) until a first location where the $P_x$ and $P_y$ values exceed respective pre-determined thresholds is reached. The locations are initial boundaries of the informative zone 220. The pre-determined thresholds can be set adaptive to each image, as overall contrast of an image can be affected by lighting and post-processing variations that may not correspond to scene variation. The pre-determined thresholds can be defined as:

$$t_x = [M(P_x \hat{} \beta_t)]\hat{}(1/\beta_t)*T, \text{ for left and right boundaries} \quad (4)$$

$$t_{y1} = [M(P_y \hat{} \beta_t)]\hat{}(1/\beta_t)*T/10, \text{ for top boundary} \quad (5)$$

$$t_{y2} = [M(P_y \hat{} \beta_t)]\hat{}(1/\beta_t)*T, \text{ for bottom boundary} \quad (6)$$

The thresholds can be different for horizontal, top, and bottom boundaries for the reason as stated above, that is to account for the asymmetry of natural images along the vertical dimension due to physical effects of gravity. The differences in parameters stated can be user determined. In an example, after the initial zone boundaries are determined, the informative zone can be expanded in each of the four directions by one fourth of the redundant area in each direction, to ensure that users have enough visible content to infer the parts that are covered by foreground images.

Figure 2C:
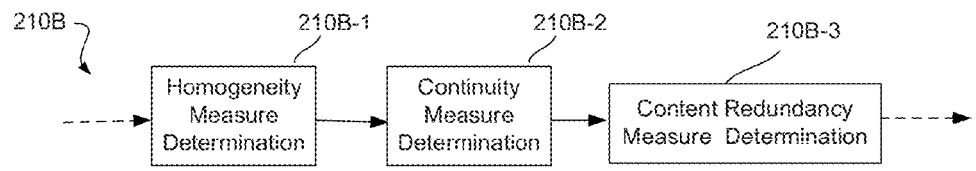
FIG. 2C is a block diagram of another example functionality implemented by an illustrative redundancy determination system.

FIG. 2C shows an example operation 210B of a redundancy determination module. In block 210B-1, a homogeneity measure of the image is determined, in block 210B-2 a continuity measure of the image is determined, and in block 210B-3 a content redundancy measure is determined. A result of implementation of block 210B is an indication of the redundancy of locations within the image.

Referring to blocks 210-B1 and 210B-2, example determination of a homogeneity measure and a continuity measure of the image, respectively, are as follows. The computation can be performed in each dimension (X and Y) independently and separately. Given a connected one dimensional area $S_g$ and a test point $v_t$ nearby to one end of $S_g$, measure the content gain $D(v_t, S_g)$ of $v_t$ given $S_g$ can be measured. Two types of metrics can be used to measure different aspects of the content gain, the homogeneity and the continuity. The $v_t$ and $v_i$ are used to specify the test point and points in $S_g$, respectively, and $f_t$ and $f_i$ are used, respectively, to represent the features of those points. The homogeneity measure provides an upper bound of the content gain between $v_t$ and $S_g$ without considering any structure information. The distance between $v_t$ and $S_g$ in feature space is taken to be positive relevant to the content gain. To capture the distance between a point and an area, the percentile of all the distances between the test point $v_t$ and all of the points $v_i$ of $S_g$ are used. Large percentile values (such as but not limited to 80%) are used to give a large enough upper bound of the distance. In this example, the percentile is used instead of maximum value as the percentile can be more tolerant to noise. The homogeneity measure can be determined using the following expression:

$$D_{homogeneity}(v_t, S_g) = P_{b, vieSg}(d(f_t, f_i)) \quad (7)$$

where $P_b$ represents the bth percentile, and $d(f_t, f_i)$ represents the distance measure of the two feature vectors. The $\Delta E$ color difference can be as the distance measure. The continuity measure can complement the homogeneity measure by capturing the structure information. In an example, the homogeneity may not capture infrastructure inside $S_g$. If the features of $v_t$ and those inside $S_g$ change gradually, $v_t$ may not give much additional information. If $S_g$ spans very widely, the upper bound of the distance may be very large, and the homogeneity measure may conclude that $v_t$ is very informative. The continuity measure can be used to compensate homogeneity measure. The distances between nearby points are used to capture the structure information. The continuity measure can be determined using the following expression:

$$D_{continuity}(v_t, S_g) = \max_{vi, vje(Sg \cup vt), vi \text{ and } vj \text{ nearby}}(d(f_i, f_j)) \quad (8)$$

where $v_i$ and $v_j$ are nearby points containing in $S_g \cup v_t$. A content gain measure can be determined from a combination of the homogeneity measure and the continuity measure. In an example, the content gain measure is a linear combination of the homogeneity measure and the continuity measure. For example, the final content gain measure can be determined according to the following expression:

$$D(v_t, S_g) = a*D_{homogeneity}(v_t, S_g) + (1-a)*D_{continuity}(v_t, S_g) \quad (9)$$

where a is a coefficient range from 0 to 1.

Figure 5:
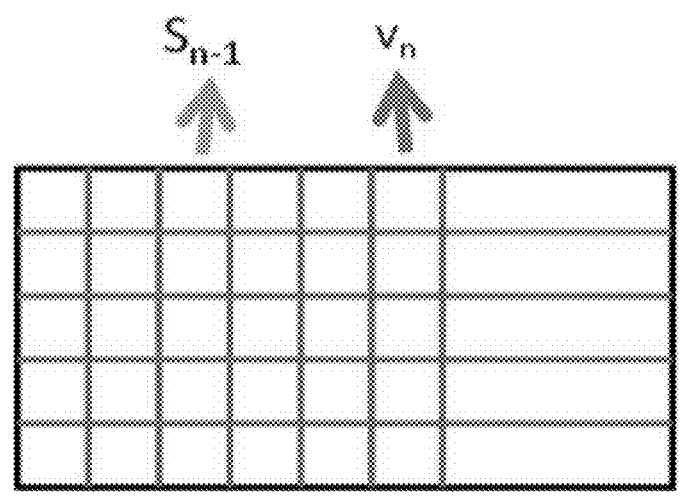
FIG. 5 Illustrates an example computation of an optimization of a boundary.
Figure 6A:
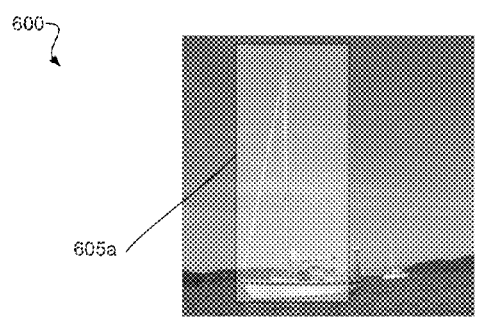
FIGS. 6A to 6D show the informative zones of example images.
Figure 6B:
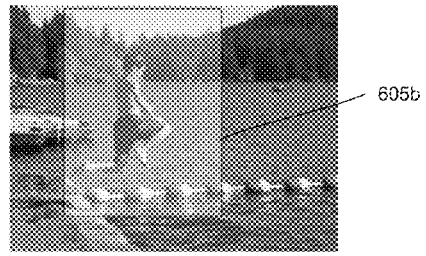
Figure 6C:
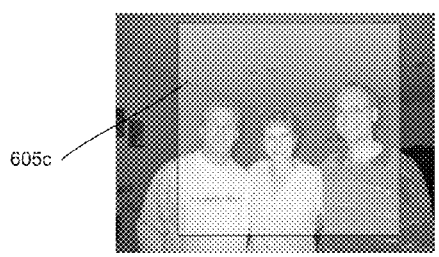
Figure 6D:
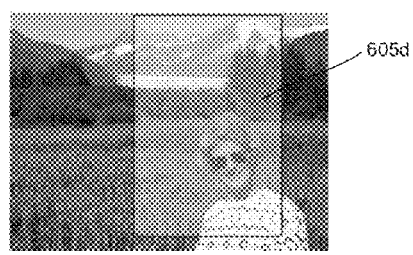

In block 210B-3, the content redundancy measure can be determined as the inverse of the content gain. The informative zone identification in block 215 is performed using the result of the implementation in block 210B-3. The content redundancy measure is used to find out the boundaries of the informative zone. The boundaries of the informative zone can be identified by a shape, such as but not limited to be a square, rectangle, circle, or other polygon. In an example, the zone that includes more content information while occupying fewer pixels is determined as the informative zone. FIG. 5 illustrates an example optimization of a boundary of the informative zone (in this example, the left boundary). In the example of FIG. 5, the four boundaries of the informative zone are taken as independent. The computation can be simplified by estimating each of the boundaries separately. For one boundary, the two dimensional computation can be reduced to a one dimensional computation if only one direction of the image is considered. In FIG. 5, the image is divided into equal size rectangle grids. To estimate a boundary, the grids are connected along the same direction as the boundary to one feature point, so the boundary in one dimension can be estimated. For example, the left boundary of the informative zone is to be determined, all grids in the same column can be connected as one feature point (see FIG. 5). For the periphery to play less of a role than the center, the boundary of informative zone can be initialized to the corresponding boundary of the image at the beginning, and then pushed towards the opposite boundary of the image. The score tradeoff between the space that the boundary pushed in and the content redundancy is optimized. Example expression for the optimization function is as follows:

$$\max_i (F(i)) \quad (10)$$

$$F(i) = F_{space}(i) + F_{content}(i) \quad (11)$$
$$= i - i * D(v_n, S_{n-1})/c$$

where i is the index of the grid, $D(v_n, S_{n-1})$ is the content redundancy measure, c is a coefficient to balance the space score and content redundancy score. In an example, after optimizing the boundary, one fourth of the redundant area can be given to the boundary to ensure to ensure that users have enough visible content to infer the parts that are covered by foreground images.

FIGS. 6A to 6D show non-limiting examples of images 600 with an indication of their informative zones 605a to 605d, respectively. In these examples, the informative zone 605a to 605d is bounded in a rectangular zone. The informative zone of each image includes the main content of the images. Face recognition can be combined with the informative zone determination since face recognition can also identify people as main content. In an example, the informative zone of an image can be used to determine where to crop the image to retain the main content of the image. For example, the system and method herein can be used with an autocropping feature of a system to autocrop an image based on the identification of its informative zone. In another example, using the informative zone, an image can be selected for use as a background image of composite images. In the example, an image in a collection of images is selected as a background image for generating a composite image based on the informative zone. For example, an image having the largest proportion of area outside the informative zone can be selected as the background image in a composite image, since it may provide more area for foreground image layout and more flexibility.

Figure 7A:
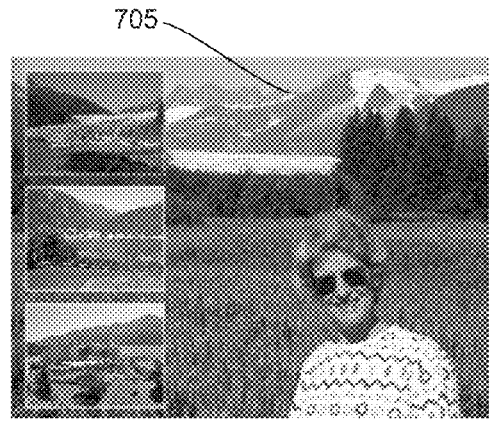
FIGS. 7A to 7D show illustrative examples of composite images generated on a canvas based on a selected background placement.
Figure 7B:
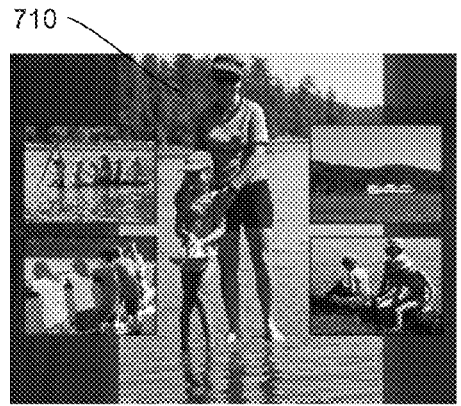
Figure 7C:
Figure 7D:
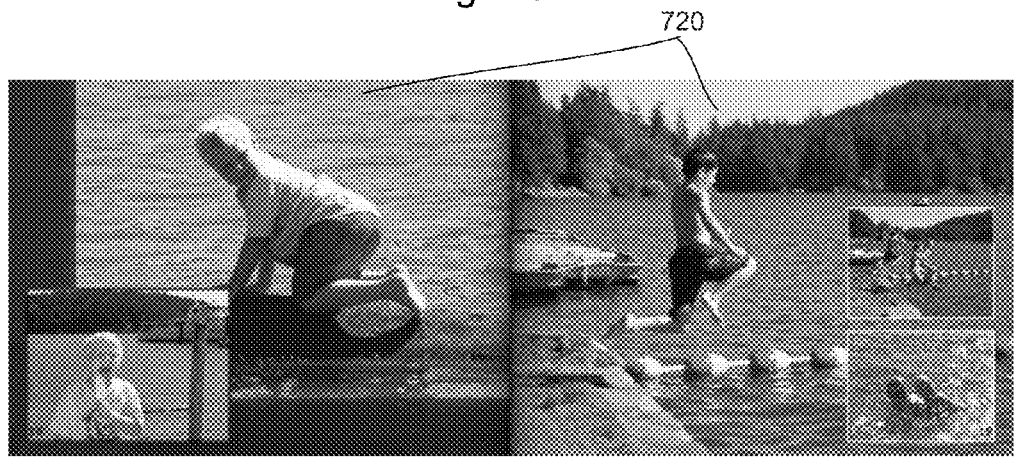

A composite image can be generated by a module based on the informative zone information. For example, an image can be determined to be a background image based on its informative zone. To generate the composite image, foreground images can be overlaid on the background image in the areas available outside of the informative zone of the background image. For example, foreground images can be overlaid on the background image using a layout tool that accounts for exclusion zones. The exclusion zone would include the informative zone of the background image. The systems and methods described in U.S. application Ser. No. 61/474,260, titled "System and Method for Determining Image Placement on a Canvas," filed Apr. 11, 2011, and co-pending U.S. application with reference no. 201005344US02, titled "System and Method for Determining Image Placement on a Canvas," filed on even date herewith, which are incorporated herein by reference in their entireties and for all purposes, can be used to determine a placement of the background image. Examples of layout tools include ExBRIC described in H. Chao et al., "Blocked recursive image composition with exclusion zones," Proceedings of the 10$^{th}$ ACM Symposium on Document Engineering, pp. 111-114, Sep. 21-24, 2010, or the layout tool described in International Application No. PCT/US2009/062401, filed Oct. 28, 2009. FIGS. 7A to 7D show illustrative examples of composite images 705, 710, 715, and 720 generated based on the informative zone information derived using a system and method described herein. FIG. 7D shows example pages from a photobook.

Figure 8:
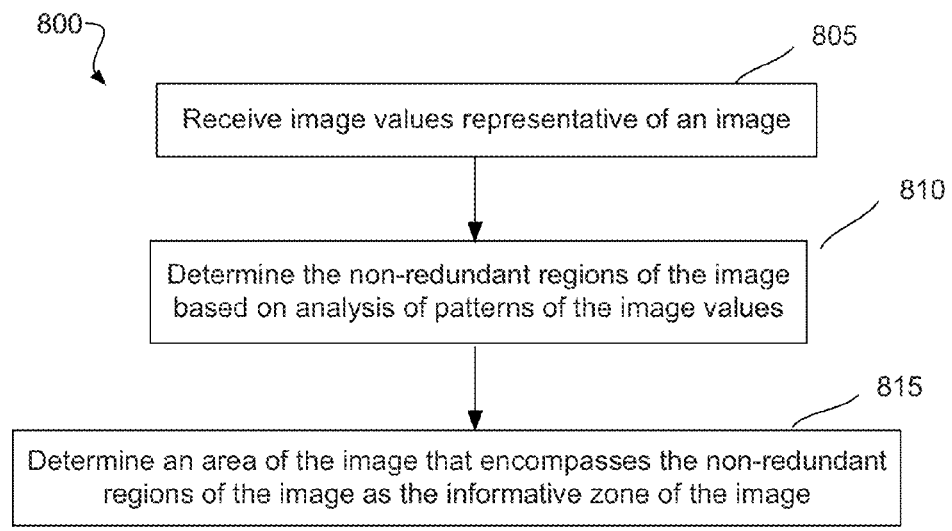
FIG. 8 illustrates shows a flow chart of an example process for determining the informative zone of an image.

FIG. 8 shows a flow chart of an example process 800 for determining an informative zone of an image. The processes of FIG. 8 can be performed by modules as described in connection with FIG. 2A. In block 805, image data representative of an image is received. In block 810, the non-redundant regions of the image are determined based on analysis of patterns of the image data. In block 815, an area of the image that encompasses the non-redundant regions of the image is determined as the informative zone of the image. In another example, using the informative zone information determine according to the principles herein, an image can be autocropped. In another example, a background image can be selected from a collection of images based on the informative zones of the images, and a composite image can be generated using an engine for overlaying foreground images outside the informative zone of the background image in the composition.

Figure 9:
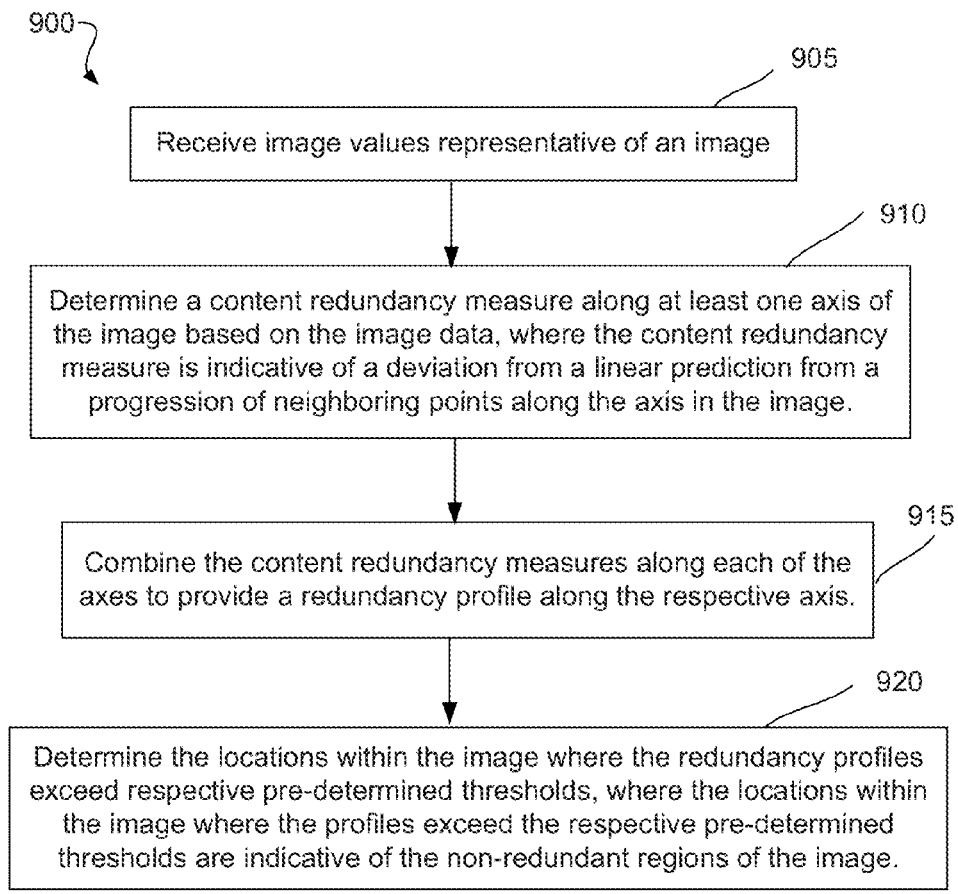
FIG. 9 illustrates shows a flow chart of an example process for determining the informative zone of an image.

FIG. 9 shows a flow chart of an example process 900 for determining the redundancy of regions of the image and for determining the non-redundant regions of the image. The processes of FIG. 9 can be performed by modules as described in connection with FIGS. 2A and 2B. In block 905, image data representative of an image is received. In block 910, a content redundancy measure along at least one dimension of the image is determined based on the image data. The content redundancy measure is indicative of a deviation from a linear prediction from a progression of neighboring points along the dimension in the image. In block 915, the content redundancy measures along each of the axes are combined to provide a redundancy profile along the respective axis. In block 920, the locations within the image where the redundancy profiles exceed respective pre-determined thresholds are determined. The locations within the image where the profiles exceed the respective pre-determined thresholds are indicative of the non-redundant regions of the image.

Figure 10:
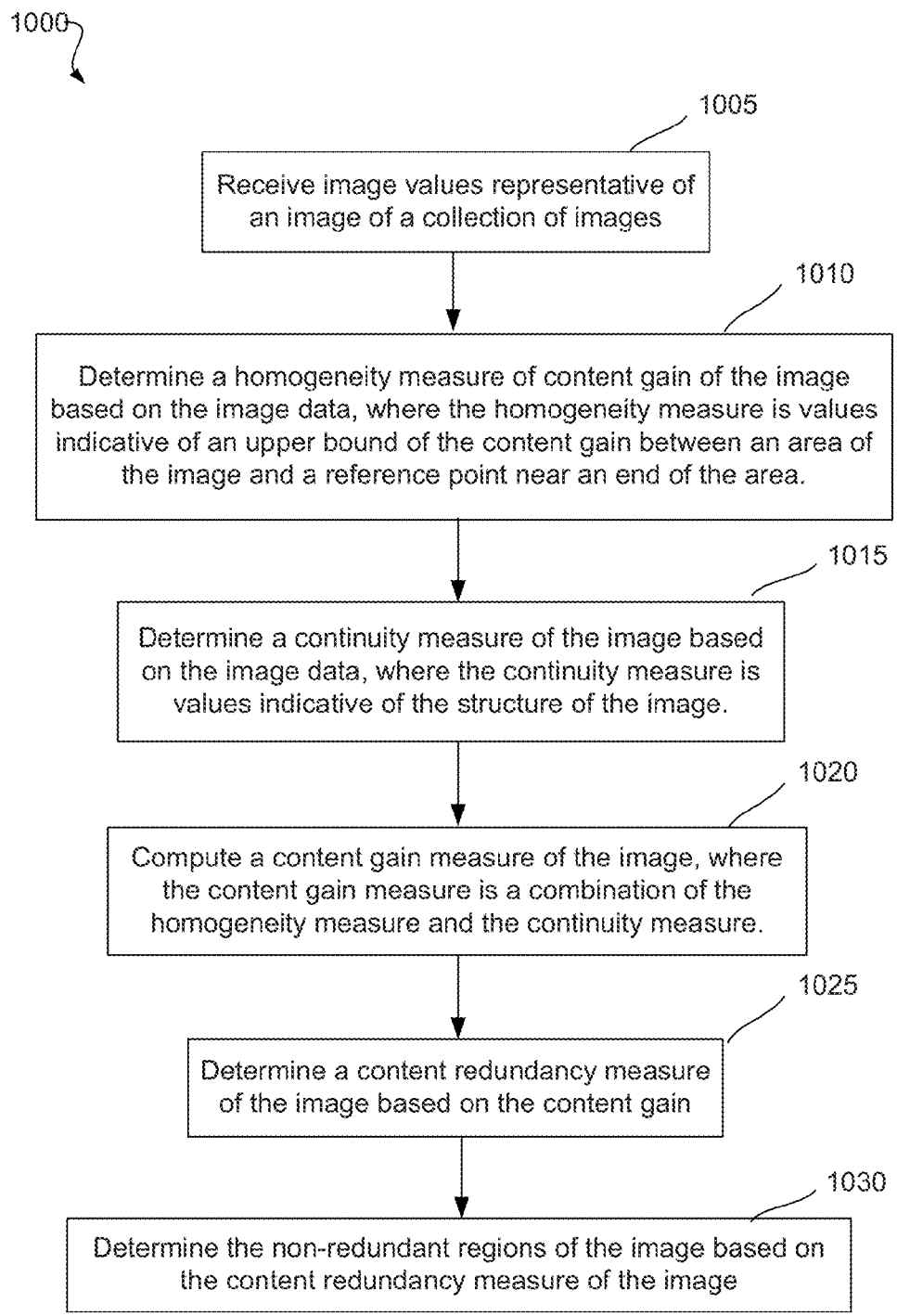
FIG. 10 illustrates shows a flow chart of an example process for determining the informative zone of an image.

FIG. 10 shows a flow chart of an example process 1000 for determining the redundancy of regions of the image and for determining the non-redundant regions of the image. The processes of FIG. 10 can be performed by modules as described in connection with FIGS. 2A and 2C. In block 1005, image data representative of an image is received. In block 1010, a homogeneity measure of content gain of the image is determined based on the image data. The homogeneity measure is values indicative of an upper bound of the content gain between an area of the image and a reference point near an end of the area. In block 1015, a continuity measure of the image is determined based on the image data. The continuity measure is values indicative of the structure of the image. In block 1020, a content gain measure of the image is determined. The content gain measure is a combination of the homogeneity measure and the continuity measure. In block 1025, a content redundancy measure of the image is determined based on the content gain. In block 1025, the non-redundant regions of the image are determined based on the content redundancy measure of the image.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A method performed by a physical computing system comprising at least one processor for determining the informative zone of an image, the method comprising:
   receiving image data representative of an image;
   determining non-redundant regions of the image based on analysis of patterns of the image data; and
   determining an area of the image that encompasses the non-redundant regions of the image as the informative zone of the image;
   wherein the image data are transformation coefficients of a transform of the image.

2. The method of claim 1, wherein the image data are pixel values.

3. The method of claim 1, wherein the image data are values in a feature space.

4. The method of claim 1, wherein the transform of the image is a perceptual pre-filtering of the image.

5. A method performed by a physical computing system comprising at least one processor for determining the informative zone of an image, the method comprising:
   receiving image data representative of an image;
   determining non-redundant regions of the image based on analysis of patterns of the image data; and
   determining an area of the image that encompasses the non-redundant regions of the image as the informative zone of the image;
   wherein determining the non-redundant regions of the image based on analysis of patterns of the image data comprises:
   determining a content redundancy measure along at least one axis of the image based on the image data, wherein the content redundancy measure is indicative of a deviation from a linear prediction from a progression of neighboring points along the axis in the image;
   combining the content redundancy measures along each of the axes to provide a redundancy profile along the respective axis; and
   determining the locations within the image where the redundancy profiles exceed respective pre-determined thresholds, wherein the locations within the image where the profiles exceed the respective pre-determined thresholds are indicative of the non-redundant regions of the image.

6. The method of claim 5, wherein the respective pre-determined thresholds are adaptively computed.

7. The method of claim 5, wherein determining the content redundancy measure comprises computing a deviation from a linear prediction in the image data at points along a direction of the image.

8. The method of claim 1, wherein determining the non-redundant regions of the image based on analysis of patterns of the image data comprises:
   determining a homogeneity measure of content gain of the image based on the image data, wherein the homogeneity measure is values indicative of an upper bound of the content gain between an area of the image and a reference point near an end of the area;
   determining a continuity measure of the image based on the image data, wherein the continuity measure is values indicative of the structure of the image;
   computing a content gain measure of the image, wherein the content gain measure is a combination of the homogeneity measure and the continuity measure;
   determining a content redundancy measure of the image based on the content gain;
   and determining the non-redundant regions of the image based on the content redundancy measure of the image.

9. The method of claim 8, further comprising computing the homogeneity measure based on distance measures between the reference point and points in the area of the image.

10. The method of claim 8, further comprising computing the continuity measure based on distance measures between at least two points in the area of the image.

11. The method of claim 8, wherein the content gain measure is a linear combination of the homogeneity measure and the continuity measure.

12. The method of claim 8, wherein the content redundancy measure is an inverse of the content gain measure.

13. The method of claim 1, further comprising cropping the image based on the informative zone.

14. The method of claim 1, further comprising generating a composite image from overlaying foreground images over the image outside of the informative zone, and wherein the composite image is part of a photobook, a photo album, a brochure, a magazine, a printable product, a fabric, a surface, or a screen.

15. A computerized apparatus, comprising:
   a memory storing computer-readable instructions; and
   a processor coupled to the memory, to execute the instructions, and based at least in part on the execution of the instructions, to:
   receive image data representative of an image;
   determine the non-redundant regions of the image based on analysis of patterns of the image data; and
   determine an area of the image that encompasses the non-redundant regions of the image as the informative zone of the image;
   wherein the instructions for determining the non-redundant regions of the image based on analysis of patterns of the image data comprises instructions to:
   determine a content redundancy measure along at least one axis of the image based on the image data, wherein the content redundancy measure is indicative of a deviation from a linear prediction from a progression of neighboring points along the axis in the image;
   combine the content redundancy measures along each of the axes to provide a redundancy profile along the respective axis; and determine the locations within the image where the redundancy profiles exceed respective pre-determined thresholds, wherein the locations within the image where the profiles exceed the respective pre-determined thresholds are indicative of the non-redundant regions of the image.

16. The apparatus of claim 15, wherein the instructions for determining the non-redundant regions of the image based on analysis of patterns of the image data comprises instructions to:
   determine a homogeneity measure of content gain of the image based on the image data, wherein the homogeneity measure is values indicative of an upper bound of the content gain between an area of the image and a reference point near an end of the area;
   determine a continuity measure of the image based on the image data, wherein the continuity measure is values indicative of the structure of the image;
   compute a content gain measure of the image, wherein the content gain measure is a combination of the homogeneity measure and the continuity measure;
   determine a content redundancy measure of the image based on the content gain; and
determine the non-redundant regions of the image based on the content redundancy measure of the image.

17. A non-transitory computer-readable storage medium, comprising instructions executable to:
   receive image data representative of an image;
   determine the non-redundant regions of the image based on analysis of patterns of the image data; and
   determine an area of the image that encompasses the non-redundant regions of the image as the informative zone of the image; and
   determine a content redundancy measure along at least one axis of the image based on the image data, wherein the content redundancy measure is indicative of a deviation from a linear prediction from a progression of neighboring points along the axis in the image.

18. The computer-readable storage medium of claim 17, wherein the instructions for determining the non-redundant regions of the image based on analysis of patterns of the image data comprises instructions to:
   combine the content redundancy measures along each of the axes to provide a redundancy profile along the respective axis; and
   determine the locations within the image where the redundancy profiles exceed respective pre-determined thresholds, wherein the locations within the image where the profiles exceed the respective pre-determined thresholds are indicative of the non-redundant regions of the image.

19. The computer-readable storage medium of claim 17, wherein the instructions for determining the non-redundant regions of the image based on analysis of patterns of the image data comprises instructions to:
   determine a homogeneity measure of content gain of the image based on the image data, wherein the homogeneity measure is values indicative of an upper bound of the content gain between an area of the image and a reference point near an end of the area;
   determine a continuity measure of the image based on the image data, wherein the continuity measure is values indicative of the structure of the image;
   compute a content gain measure of the image, wherein the content gain measure is a combination of the homogeneity measure and the continuity measure;
   determine a content redundancy measure of the image based on the content gain; and
determine the non-redundant regions of the image based on the content redundancy measure of the image.

\* \* \* \* \*